(12) United States Patent
Harrington et al.

(10) Patent No.: US 7,315,675 B2
(45) Date of Patent: Jan. 1, 2008

(54) METHOD, AND ARTICLE OF THE METHOD, FOR FABRICATING A FLEXIBLE, HOLLOW WAVEGUIDE

(75) Inventors: James A. Harrington, Chester, NJ (US); Veena Gopal, Olivette, MO (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 0 days.

(21) Appl. No.: 10/764,101

(22) Filed: Jan. 23, 2004

(65) Prior Publication Data
US 2006/0263023 A1    Nov. 23, 2006

Related U.S. Application Data

(60) Provisional application No. 60/442,165, filed on Jan. 23, 2003.

(51) Int. Cl.
G02B 6/26    (2006.01)
(52) U.S. Cl. .............................. 385/46; 385/15; 385/39; 385/141
(58) Field of Classification Search ................. 385/46, 385/141, 146
See application file for complete search history.

(56) References Cited

U.S. PATENT DOCUMENTS

| | | | |
|---|---|---|---|
| 5,440,664 A | 8/1995 | Harrington | 385/125 |
| 5,567,471 A | 10/1996 | Harrington et al. | 427/163.2 |
| 5,815,627 A | 9/1998 | Harrington | 385/125 |
| 5,995,696 A * | 11/1999 | Miyagi et al. | 385/125 |

OTHER PUBLICATIONS

Y. Fink, J. N. Winn, S. Fan, C. Chen, J. Michel, J. Joannopoulos, and E. Thomas, "A dielectric Omnidirectional Reflector," Science, vol. 282, pp. 1679-1682 (Nov. 27, 1998).
R. S. Mane and C. D Lokhande, "Chemical deposition method for metal chalcogenide thin films," Materials Chemistry and Physics 65, pp. 1-31 (Jan. 3, 2000).
P.K. Nair, M.T.S Nair, V.M Garcia, O.L. Arenas, Y. Peña, A. Castillo, I.T Ayala, O Gomezdaza, A. Sanchez, J. Compos, H. Hu, R. Suarez, and M.E. Rincon, "Semiconductor thin films by chemical bath deposition for solar energy related applications," Solar Energy Materials and Solar Cells 52, pp. 313-344 (1998).
P. C Rieke and S.B. Bentjen, "Deposition of Cadmium Sulfide Films by Decomposition of Thiourea in Basic Solutions," Chem. Mater. 5, pp. 43-53 (1993).
V. Gopal, and J. A. Harrington, "Dielectric Coatings for Ag/Dielectric Hollow Glass Waveguides," Optical Fibers and Sensors for Medical Applications II, Proc. SPIE 4616, pp. 143-151 (2002).

(Continued)

Primary Examiner—Jennifer Doan
(74) Attorney, Agent, or Firm—Watov & Kipnes, P.C.; Kenneth Watov (57) ABSTRACT

A flexible, hollow, waveguide is featured, that functions in the visible region. The waveguide comprises a hollow, flexible, silica-glass tube having a smooth bore, that is coated with a reflective substance on the inner bore surface. A composite of two sulfide materials are then layered over the reflective substance. The sulfide materials form a high contrasting refractive index of approximately 2:1, thus creating a photonic, bandgap tube.

28 Claims, 4 Drawing Sheets

OTHER PUBLICATIONS

V. Gopal, and J.A. Harrington, "Metal Sulfide Coatings for Hollow Glass Waveguides," Optical Fibers and Sensors for Medical Applications III, Proc. SPIE 4957, pp. 97-103 (2003).

M. Miyagi and S. Kawakami, "Design Theory of Dielectric-Coated Circular Metallic Waveguides for Infrared Transmission," Journal of Light wave Technol. LT-2, pp. 116-126 (Apr. 1984).

M Mohebbi, R Fedosejevs, V. Gopal, and J. A. Harrington, "Silver-coated hollow-glass waveguide for applications at 800 nm," Applied Optics vol. 41, pp. 7031-7035 (Nov. 20, 2002).

K. Matsuura, Y. Matsuura, and J.A. Harrington, "Evaluation of gold, silver, and dielectric-coated hollow glass waveguides," Opt. Eng. 35 (12), pp. 3418-3421 (Dec. 1996).

C. D. Rabii, D. J. Gibson, and J.A. Harrington, "Processing and characterization of silver films used to fabricate hollow glass waveguides," Applied Optic vol. 38, pp. 4486-4493 (Jul. 20, 1999).

T. Abel, J. Hirsch, and J.A. Harrington, "Hollow glass waveguides for broadband infrared transmission," Optics Letters vol. 19, pp. 1034-1036 (Jul. 15, 1994).

R. Dahan, J. Dror, and N. Croitoru, "Characterization of Chemically Formed Silver Iodide Layers for Hollow Infrared Guides," Mater. Res. Bull. 27, pp. 761-766 (1992).

C.D. Rabii and J.A. Harrington, "Measurement and control of thin film uniformity in hollow glass waveguides," Opt. Eng. 38, pp. 2009-2015 (Dec. 1999).

Y. Matsuura, T. Abel, and J.A. Harrington, "Optical properties of small-bore hollow glass waveguides," Applied Optics vol. 34, pp. 6842-6847 (Oct. 20, 1995).

Veena Gopal, and James A. Harrington; Deposition and characterization of metal sulfide dielectric coatings for hollow glass waveguides; Optics Express, vol. 11, No. 24; pp. 3182-3187; Dec. 1, 2003.

Christopher C. Gregory, and James A. Harrington; Attenuation, modal, and polarization properties of n<1, hollow dielectric waveguides; Applied Optics, vol. 32, No. 27; pp. 5302-5309; Sep. 20, 1993.

\* cited by examiner

METHOD, AND ARTICLE OF THE METHOD, FOR FABRICATING A FLEXIBLE, HOLLOW WAVEGUIDE

CROSS REFERENCE TO RELATED APPLICATION

This application is based on U.S. provisional patent application Ser. No. 60/442,165 filed on Jan. 23, 2003.

FIELD OF THE INVENTION

The present invention relates to waveguides and methods of making same, and more particularly to a flexible, rugged waveguide comprising a photonic, bandgap, hollow fiber, transmitting in the infrared and visible regions.

BACKGROUND OF THE INVENTION

The flexible waveguide of this invention is based upon technology disclosed in U.S. Pat. No. 5,815,627; issued: Sep. 29, 1998; U.S. Pat. No. 5,567,471, issued: Oct. 22, 1996; and U.S. Pat. No. 5,440,664; issued: Aug. 8, 1995, which technology and teachings are meant to be incorporated herein by way of reference. The aforementioned waveguide inventions have a common inventor, James Harrington, and a common assignee, Rutgers University. In aforementioned U.S. Pat. No. 5,815,627, it was taught that waveguides are capable of guiding both IR and visible radiation. This is also a distinguishing feature of this invention. This invention, however, has fabricated a waveguide that can be tailored for use over a wide wavelength range by the use of multiple, uniform, film coatings deposited by liquid phase chemistry methods. The coatings of the inventive waveguide have an additive, are fabricated by an additive technique rather than a subtractive method, i.e. the former Ag layer as taught in the aforementioned patents, was originally depleted in part, with the establishment of the AgI layer. The AgI layer is totally absent in the present application. Even the Ag layer is only present in one embodiment thereof, and is but one selection of other metals used for the metallic underlay.

This invention utilizes dielectric layers of sulfide materials, which are built in stacked geometries to fashion unique waveguide structures.

The waveguides of the present invention can be fabricated in one of two novel ways:

(a) The dielectric layers of cadmium and lead sulfide can be applied directly to the smooth bore surface of a silica glass tube; or (b) The dielectric layers of the cadmium and lead sulfides can be applied to a metallic surface, for example, metals selected from a group consisting of Ag, Au, Cu, Pt, Ni, Pt, Mb, and Al, which has been smoothly coated upon the smooth inner bore of the silica glass tube.

A protective polymer coating is layered upon the outer surface of the tube in both embodiments. The dielectric layers of this invention comprise CdS and PbS, which form a unique compatibility pair, in which deposition of each material does not affect the underlying layer. These paired sulfides can be stacked in multiple, thin film layers to provide specific and unique characteristics. The sulfide layers are deposited using similar liquid-phase chemistry taught in the prior patents. The thickness of each layer can be tailored for use over a wide range of wavelengths. The measured losses for a single layer of CdS or a PbS film deposited over an Ag layer was in agreement with the prior Ag/AgI film studied at 10.6 µm for applications using $CO_2$ IR lasers.

The CdS and PbS materials have disparate refractive indices with a ratio of about 2 to 1. This is often referred to in this technology, as the index contrast ratio. The high contrast of this layering makes possible a photonic bandgap hollow fiber. The deposit of the cadmium sulfide layer provides the transmission in the visible region.

DISCUSSION OF RELATED ART

Prior-art hollow waveguides can provide poor beam quality (poor transverse spatial coherence). FIG. 12B of Gregory & Harrington (see below cite), and FIGS. 5 and 6 of Croitoru et al., "Characterization of hollow fibers for the transmission of infrared radiation", Appl. Opt. v. 29, 1805-1809 (20 Apr. 1990) and Dror et al., "Hollow Tubes for Transmitting IR Laser Energy for Surgery Applications", presented to ICA-LEO '89 (15-20 January, Los Angeles), are representative of the characteristics of prior art hollow waveguides.

U.S. Pat. No. 5,815,627; issued: Sep. 29, 1998; U.S. Pat. No. 5,567,471, issued: Oct. 22, 1996; and U.S. Pat. No. 5,440,664; issued: Aug. 8, 1995, depict Ag/AgI film waveguides. Typically, waveguides such as are disclosed in Matsuura & Miyagi, "Low-loss metallic hollow waveguides coated with durable and nontoxic ZnS", Appl. Phys. Lett. v. 61, 1622-1623 (5 Oct. 1992) is superior. Waveguides with metal tube walls that serve as the supporting structure for any coatings (such as disclosed in U.S. Pat. No. 5,005,944, issued to Laakman et al., and U.S. Pat. No. 4,913,505, issued to Levy '505) may be capable of handling substantial power, but are semi flexible at best. Those with plastic tube walls (such as disclosed in U.S. Pat. No. 4,930,863, issued to Croitoru et al.) are flexible, but have marginal power-handling capability at best and high loss. Yet-earlier devices such as disclosed in U.S. Pat. No. 3,436,141, issued to Comte, U.S. Pat. No. 3,583,786, issued to Marcatili, and U.S. Pat. No. 3,963,828, issued to Onoda et al., has not proven useful for the applications of present interest at the wavelengths of present interest.

Hollow waveguide fibers having an index of refraction less than one, have not yet attained both transmission characteristics and flexibility required for many applications. However, in other respects these waveguide fibers are quite satisfactory at selected wavelengths. See Gregory & Harrington, "Attenuation, modal, and polarization properties of n<1, hollow dielectric waveguides", Appl. Opt. v. 32, 5302-5309 (20 Sep. 1993).

As aforementioned, the current invention is an improvement over the waveguide devices of the prior aforesaid Harrington patents.

The present invention has made loss measurements at key laser wavelengths, e.g. as a $CO_2$ laser waveguide. The current invention provides a flexible, hollow, waveguide, and method for making same. The waveguide tube meets the need for a flexible, visible and IR region, laser transmission medium having a relatively low loss.

SUMMARY OF THE INVENTION

In accordance with the present invention, there is featured a flexible, hollow waveguide for the transmission of radiation in the infrared and visible regions, and a method of making same. The waveguide comprises a hollow, flexible, silica-glass tube having a transparent annular body defining a bore with a smooth inner bore surface. In a first embodiment, a reflective, thin film, metallic layer, consisting of a metal selected from a group of metals consisting of: Ag, Au, Cu, Ni, Pt, Mb, Zn, and Al, is coated upon the smooth inner bore surface of the silica-glass tube. A single, thin film cadmium sulfide dielectric layer, or a pair of thin film dielectric, cadmium and lead sulfide layers respectively, are then disposed upon said reflective layer. Cadmium sulfide transmits radiation in both the visible and infrared region. This pair of sulfide layers has disparate refractive indices with a ratio of approximately 2:1, which is vital to provide high contrast, and to fabricate a photonic, bandgap, hollow waveguide tube. In a second embodiment, no metallic layer is used, and the pair of thin film cadmium and lead sulfide layers is multiply stacked directly upon the smooth, inner bore of the silica-glass tube.

The thin films are deposited using dynamic wet chemistry, and the thickness is tailored to minimize the attenuation of the waveguide over specific infrared wavelengths.

It is an object of the present invention to provide an improved flexible, hollow waveguide.

It is another object of this invention to provide a flexible, hollow waveguide comprising a photonic, bandgap hollow fiber.

It is yet a further object of the current invention to provide a flexible, hollow waveguide, which transmits radiation in both the visible and infrared region.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, a flexible, hollow, waveguide is featured, that functions in the infrared and visible regions. The waveguide comprises a hollow, flexible, silica-glass tube having a smooth bore that is coated in one embodiment with a reflective, metal substance on the inner bore surface. A pair of sulfide materials respectively of cadmium and lead sulfide, is then layered over the reflective substance. The sulfide materials form a high contrasting refractive index of approximately 2:1, thus creating a photonic, bandgap tube. In a second embodiment, the metallic layer is not used, and the pair of sulfide layers is singularly or multiply stacked directly upon the bore.

There are two embodiments of the invention. The first embodiment fabricates the waveguide by liquid phase deposition of a metallic, reflective layer, usually Ag upon the smooth inner bore surface of the silica-glass tube. Other metals of choice such as Au, Cu, Ni, Pt, Zn, Mb, Al, etc., can also be used. Then, a single or pair of sulfide-containing dielectrics is coated over the metal. In the second embodiment of the invention, no metallic or reflective layer is deposited, and only pairs of sulfide-containing dielectric films are coated upon the smooth inner bore.

Figure 6:
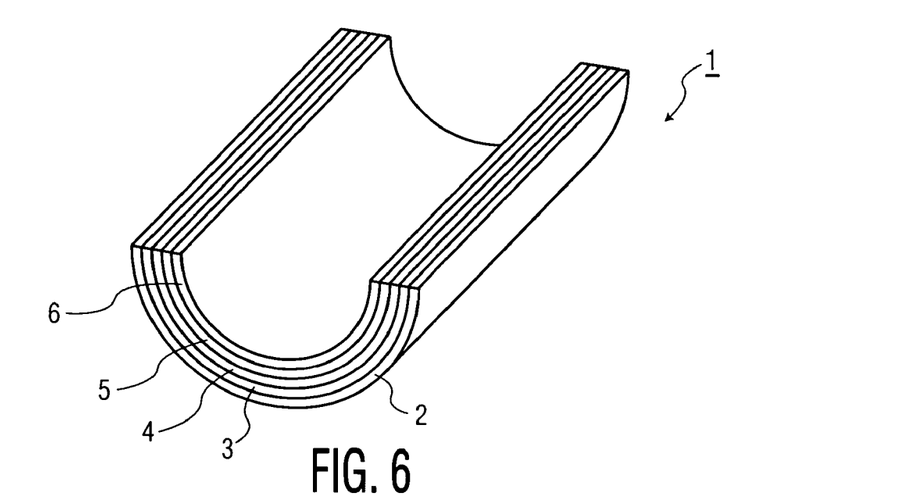
FIG. 6 illustrates a partial schematic view of the first embodiment of the waveguide of this invention.

Now referring to FIG. 6, a first embodiment of the waveguide 1 of this invention is illustrated. The waveguide 1, comprises a silica-glass tube 3, having a thin-wall of approximately 50 to 200 microns wall thickness, and a smooth inner bore. A reflective, metallic layer 4 is coated over the smooth bore using liquid phase chemistry, as taught in the aforementioned patents. The reflective layer may comprise Ag, Au, Ni, Cu, Al, Pt, Zn, Mb, etc. A single layer of cadmium sulfide, or paired sulfide composite of cadmium sulfide and lead sulfide, respectively, is layered over the reflective layer 4. The sulfide composite comprises respective layers 5 and 6, of cadmium and lead sulfides, respectively. The sulfide materials form a high contrast, refractive index of approximately 2:1 creating a photonic, bandgap tube. The silica-glass tube 3 is covered with an outer layer 2 of plastic for protection.

Figure 6A:
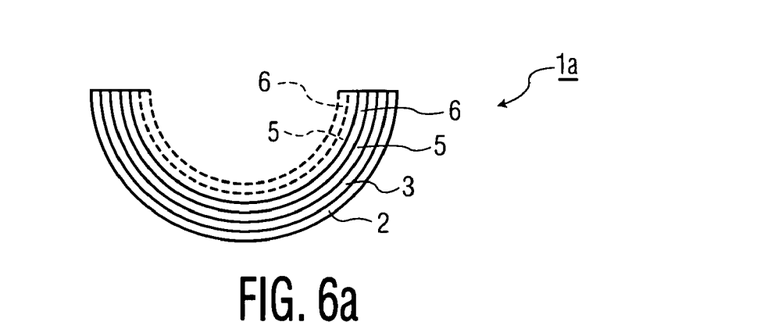
FIG. 6a depicts a partial schematic view of the second embodiment of the waveguide of this invention.

Referring to FIG. 6a, a waveguide 1a is shown having a flexible, hollow, silica-glass tube 3, upon which is stacked at least one pair of cadmium and lead sulfide layers 5, and 6, respectively. A multiplicity of pairs of cadmium and lead sulfide layers 5 and 6 can be deposited over the first pair, as shown in phantom.

EXAMPLES

1. A smooth, inner bore surface 3 of a flexible hollow tube 2 of a waveguide 1, is coated with a metallic, reflective layer 4 of silver. The silver layer 4 was then coated with cadmium sulfide to form layer 5, and then coated with lead sulfide to form layer 6. Each layer was coated using liquid phase chemistry, utilizing a peristaltic pump. The flow rate of the solutions through the hollow tube was chosen at 30 ml/min.

The cadmium sulfide coating was applied over the Ag coating, using one of the two chemical baths.

1. I) Cadmium Nitrate 0.1 M, II) thiourea 0.5 M—this is considered a full concentration solution. For most depositions, the concentration was reduced to ½ to ⅙ the full concentration.
    2. I) Cadmium acetate 5 mM, II) thiourea 100 mM. All the coating solutions were prepared in distilled and deionized water. The solutions are prepared using an ultrasonicator or a magnetic stirrer.

The Cd ion containing solution is complexed with ammonium hydroxide solution. Initial addition of ammonia will form a white precipitate of $Cd(OH)_2$ and the solution becomes turbid. With further addition of ammonia dissolves the white precipitate and forms a soluble Cd-ammonia complex. The solution pH is maintained between 10 and 13 using sodium hydroxide solution and nitric acid as titrating agents. The second solution of sulfide ion is prepared by dissolving thiourea in water. The two solutions were then flowed through the hollow tube and coated the Ag. The complexed Cd ion solution reacts with the sulfide ion containing solution to deposit a thin film of CdS. The hollow tube was dried in flowing air.

2. For deposition of PbS thin films, lead nitrate was used as the source of Pb ions and thiourea or a mix of thiourea and thioacetamide was the source of sulfide ions. All the solutions were prepared in distilled and deionized water (DI). The solutions are prepared using an ultrasonicator or a magnetic stirrer. The chemical bath used for the deposition of lead sulfide is as given below:

Solution 1: A) $Pb(NO_3)_2$: 4 g/500 ml; b) NaOH: 12 g/500 ml, and

Solution 2: thiourea: 6 g/1000 ml or thiourea 4 g and thioacetamide 2 g to 1000 ml of water. The NaOH solution is slowly added to the $Pb(NO_3)_2$ solution while continuing to stir. Initially the solution turns turbid due to the precipitation of $Pb(OH)_2$ which dissolves to form a soluble Na—Pb-hydroxide complex on further addition of NaOH. The complexed lead ion reacts with a sulfide ion in solution to form PbS. Deposition of PbS requires that the solutions containing Pb and S ions are supersaturated in order to precipitate out in solution and nucleate heterogeneously on the substrate. The bore surface of the waveguide was coated with the solutions using the peristaltic pump as previously shown. Surfaces were air dried.

3. Infrared and visible region investigation of Ag/CdS, Ag/PbS, Ag/CdS/PbS and Ag/CdS/PbS/CdS waveguides, as can be observed with reference to the FIGS. 1 through 3 and 5, will now be described.

In the original work on omni directional waveguides authored by Fink, et al. (Y. Fink, J. N. Winn, et al., "A dielectric omnidirectional reflector," Science, 282, 1679-1682 (1998)) an all-dielectric structure of alternating low/high index films was described. In this invention, use of a metallic film in conjunction with a multilayer dielectric stack means that the waveguide will need fewer dielectric layers to achieve the same loss as an all dielectric omni directional structure. CdS and PbS films are transparent in the 2 to 12 μm region. The refractive indices of CdS and PbS are 2.25 and 4.27 at 1.55 μm and 2.25 and 4.0 at 10.6 μm, respectively. This gives an index contrast of 4.27/2.25=1.9 at 1.55 μm and 1.78 at 10.6 μm. These two dielectric materials and other sulfides such as ZnS and ZnSe may be deposited in thin film form using straightforward solution chemistry methods (R. S Mane and C. D Lokhande, "Chemical deposition method for metal chalcogenide thin films; Mat. Chem. Phys. 65, 1-31 (2000); P. C Rieke and S. B. Bentjen, "Deposition of cadmium sulfide films by decomposition of thiourea in basic solution," Chem. Mat. 5, 43-53 (1993)). Furthermore, these two materials are compatible, and the wet chemistry methods used to deposit both films are similar (V. Gopal, and J. A. Harrington, "Dielectric coatings for Ag/dielectric hollow glass waveguides," in Optical Fibers and Sensors for Medical Applications II, Proc. SPIE 4616, 143-151 (2002); V. Gopal, and J. A. Harrington, "Metal sulfide coatings for hollow glass waveguides," in Optical Fibers and Sensors for Medical Applications III, Proc. SPIE 4957, 97-103 (2003)).

Dielectric-coated metallic hollow waveguides of this invention are designed to minimize the attenuation of the waveguide over a particular IR wavelength region by optimizing the thickness of each dielectric layer. The well-established theory of Miyagi and Kawakami (M. Miyagi and S. Kawakami, "Design theory of dielectric-coated circular metallic waveguides for infrared transmission," J. Lightwave Technol. LT-2, 116-126 (1984)) was used to calculate the expected losses for multilayers of CdS and PbS coatings. Using this theory, and the n and k values for CdS and PbS, the losses for single and multilayer films at both 1.55 and 10.6 μm were calculated. The calculations at 10.6 μm show that a 1,000-μm bore of a hollow glass waveguide with a 3-layer stack of CdS/PbS/CdS films deposited over Ag will have a straight loss of 0.016 dB/m compared to a straight loss of 0.07 dB/m for a single layer CdS film deposited over Ag. That is, the calculated attenuation coefficients are approximately four times less for the three layer design, compared to a single dielectric layer at 10.6 μm.

As aforementioned, hollow glass waveguides are prepared in a two step process in which an Ag film is first deposited on the inner surface of the silica tubing and then a dielectric layer of CdS or PbS is deposited on top of the metallic layer. For multilayer dielectric structures, sequential deposition of alternating low/high films leads to the structures, Ag/CdS, Ag/CdS/PbS, and Ag/CdS/PbS/CdS. The Ag film is deposited on the inner surface of the silica tubing using a liquid-phase reduction reaction typical of that used in the prior art using Ag/AgI hollow glass waveguides. The thickness of the Ag film is chosen to be sufficiently thick to prevent any transmission through the film, but thin enough so that the surface roughness is as low as possible. Specifically, the thickness of the Ag film is chosen to be at least ten times the skin depth at 10.6 μm. The skin depth of an Ag film at 10.6 μm is 12 nm. In all the experiments CdS and PbS have been deposited on Ag films that vary in thickness from 150 to 200 nm. At this thickness the Ag films are quite smooth (<12 nm rms roughness) and, therefore, they provide a good surface for the deposition of the dielectric layers. A very important feature of the CdS and PbS coatings is that they are additive and, thus, independent of the Ag film. This is in strong contrast to the waveguides made using AgI coatings. AgI is deposited in a subtractive process in which AgI is formed by the diffusion of iodine ions into the underlying silver film. Therefore, to produce a thick dielectric layer of AgI will require a thick starting layer of Ag. In an article by Rabii and Harrington (C. D. Rabii and J. A. Harrington, "Measurement and control of thin film uniformity in hollow glass waveguides," Opt. Eng. 38, 2009-2015 (1999)), they have shown that the surface roughness of both the Ag and the AgI film increases with increasing thickness of the Ag layer.

Additional Examples:

As aforementioned, CdS and PbS thin films were deposited using a wet chemistry deposition technique (R. S Mane and C. D Lokhande, "Chemical deposition method for metal chalcogenide thin films," Mat. Chem. Phys. 65, 1-31 (2000)). Cadmium nitrate and cadmium acetate are used as the source of Cd ions; lead nitrate the source of Pb ions; and thiourea, $(SC(NH_2)_2)$, the source of S ions. It is important to accurately control pH of these solutions, since the CdS and PbS precipitates are stable only in the pH range 10 to 13. The pH control and chelating is achieved using an ammonia solution for CdS and sodium hydroxide for PbS. Specifically, the pH for aqueous $Cd(NO_3)_2$ is maintained between 11 and 12. Owing to the fact that the reaction rate also changes with the pH, it is necessary to calibrate the process for a given pH range. The thickness of both CdS and PbS increases with increasing concentration of Cd, Pb and S ions in solution and with increasing deposition time. From a study of the growth kinetics for both CdS and PbS thin films, it has been established, that the optimal concentration and flow rate conditions for uniform film deposition for tubing require lengths greater than 1.5 m. The best coatings were made using >0.01 M solutions and pumping rates of 30 ml/min.

The multilayer dielectric structures of Ag/CdS/PbS and Ag/CdS/PbS/CdS, were prepared in a manner similar to the single-layer dielectric metallic waveguides. The different layers were coated in a sequential manner with an intermediate drying step after coating each layer. An Ag-only tube was coated with a single layer of either CdS, or PbS, when the 2- and 3-layer structures were being coated as an independent check on the thickness for each layer.

Figure 1:
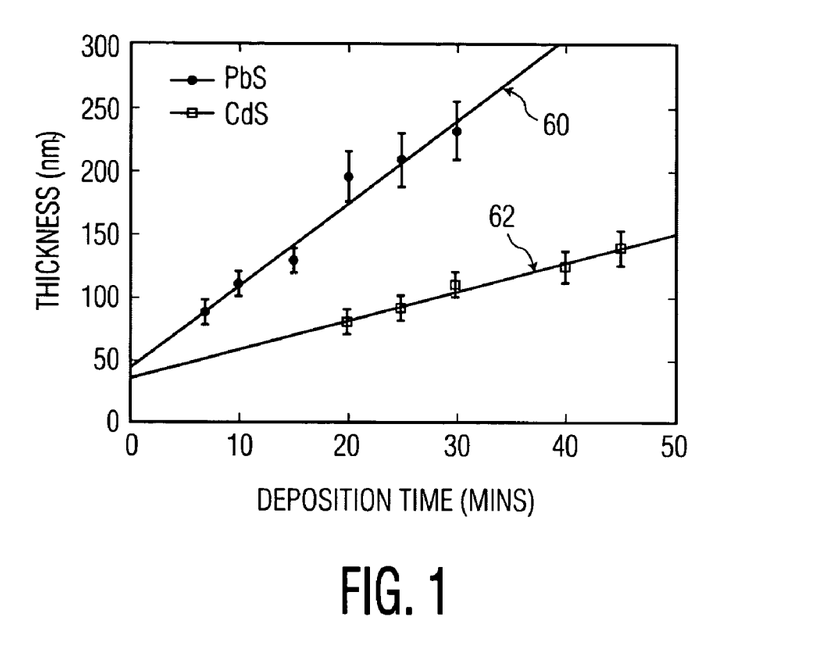
FIG. 1 depicts the growth kinetic graph of the thin films deposited in the Ag coated 1,000-μm bore waveguide.
Figure 2:
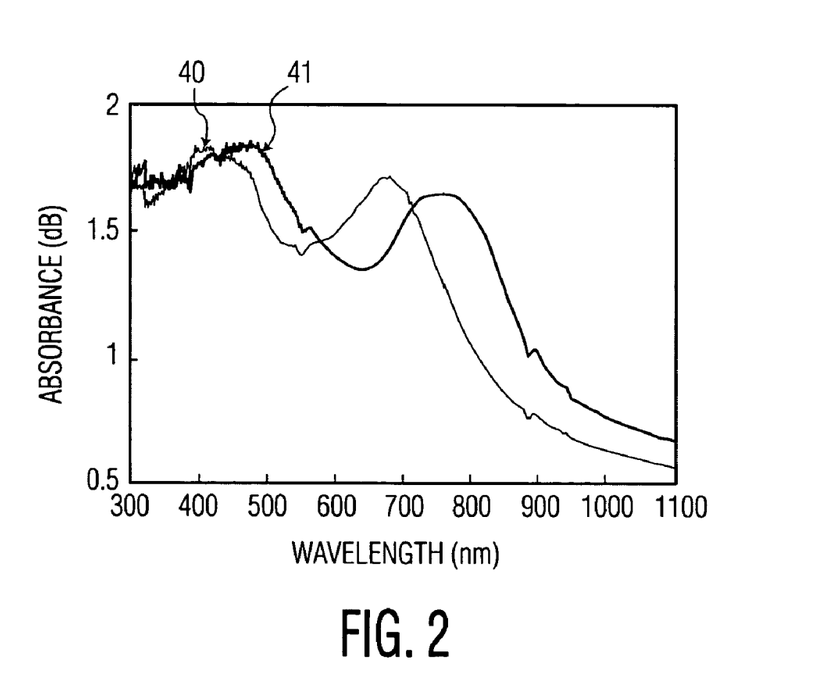
FIG. 2 shows the graph of the UV-VIS spectra of a 1,000-μm bore Ag/CdS waveguide.
Figure 3:
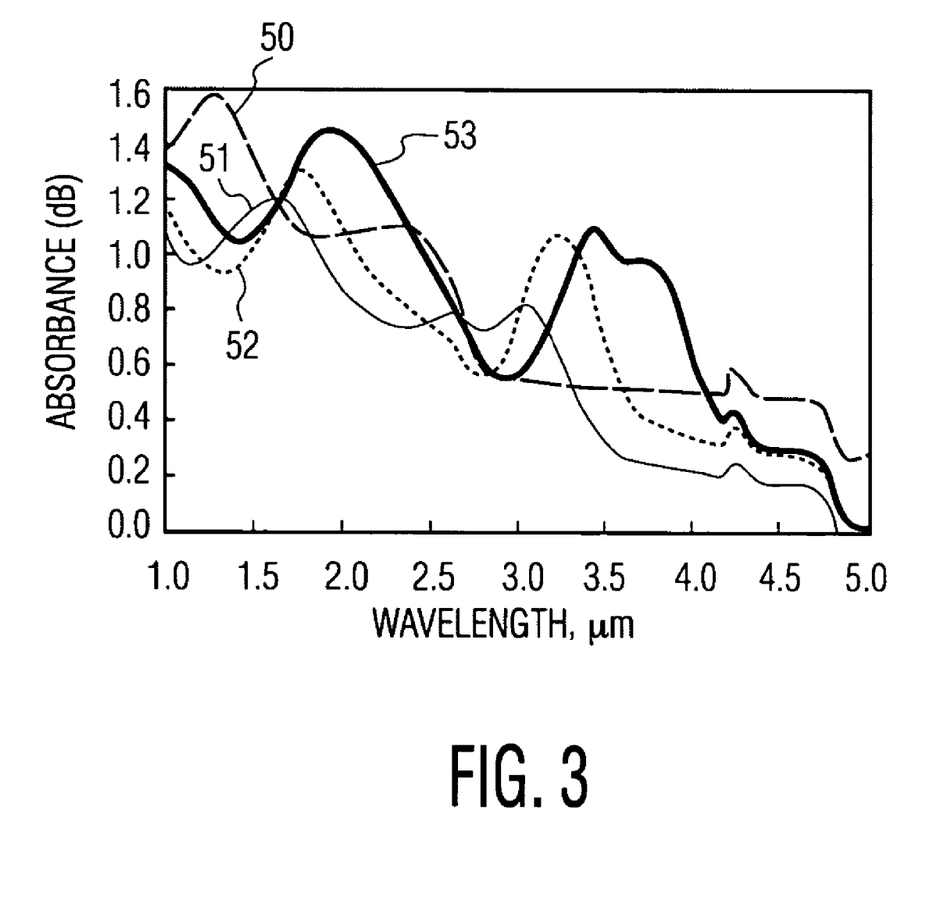
FIG. 3 illustrates the graph of the FTIR spectra of a 1,000-μm bore Ag/PbS waveguide.

Optical Characterization of Ag/Sulfide Film Waveguides:

The spectral characteristics of the Ag/CdS and Ag/PbS hollow glass waveguides were evaluated using a Perkin Elmer UV-VIS spectrometer, and Nicolet Protégé FTIR. A typical spectral response shows interference peaks, which depend on the thickness of the dielectric thin films. The thickness of a single layer dielectric, "d", was calculated from the peak position of the longest-wavelength interference band, $\lambda_p^{(m)}$, using the relation, $$d = \frac{m \cdot \lambda_p^{(m)}}{4 \cdot \sqrt{n_1^2 - 1}}, \quad (1)$$

where m is the order of the interference maxima (m=1 for the longest-wavelength band); $\lambda_p$ is the wavelength of the $m^{th}$ absorption peak; and $n_1$ is the refractive index of the dielectric film. From Equation (1) it is observed, that the peak position shifts to longer wavelengths as the thickness of the film increases. Spectral data has been used to determine the thickness of films prepared using different growth kinetics. The film thickness obtained from the optical measurements has then been correlated with direct thickness measurements using a field-emission scanning electron microscope (FESEM). In this way one obtains the growth kinetic curves for CdS and PbS deposited on Ag, as shown in FIG. 1.

In FIG. 1, the growth kinetic curves of the CdS and PbS thin films deposited in a Ag coated, 1,000 µm bore Hollow Glass Waveguide, are shown. The datum points of curves 60 and 62 represent color regions that one would see looking through the waveguides with an optical microscope, and are representative of film thickness.

All films were prepared using 0.01 M solutions and a flow rate of 30 ml/min. The growth kinetics curves in FIG. 1 indicate that 20 CdS (open symbols) has a slower growth rate on Ag compared to PbS (solid symbols) under similar conditions. The reason for the slower growth rate for CdS compared to PbS, is that the CdS complexes with the ammonia used in the deposition and this decreases the rate of deposition. The data also shows that the thickness of both dielectrics increases linearly with time, with growth rates of ~2.3 and 6.9 nm/min for CdS and PbS, respectively. The mechanism for linear growth is based on the Stransi-Krastanov model of island-like growth (M. Ohring, The materials science of thin films, (Academic Press, Boston, (1992)). This mechanism involves nucleation and growth in the linear growth region. This information is important as we need to carefully control film thickness for single and multilayer structures. The UV-VIS spectra for the Ag/CdS is given in FIG. 2, and the FTIR spectra for the Ag/PbS in FIG. 3. The spectral data clearly show that the position of the interference peaks 50, 51, 52, and 53, respectively, shifts to longer wavelengths as the thickness of the film increases as predicted by Equation (1). It has also been observed relative to FIG. 2, that the Hollow Glass Waveguides show a color variation. This is due to selective filtering of the input white light by the thin film coating (interference effect). This color variation is seen with the CdS coatings, but not the PbS films, because these films do not transmit well at visible wavelengths.

Figure 4:
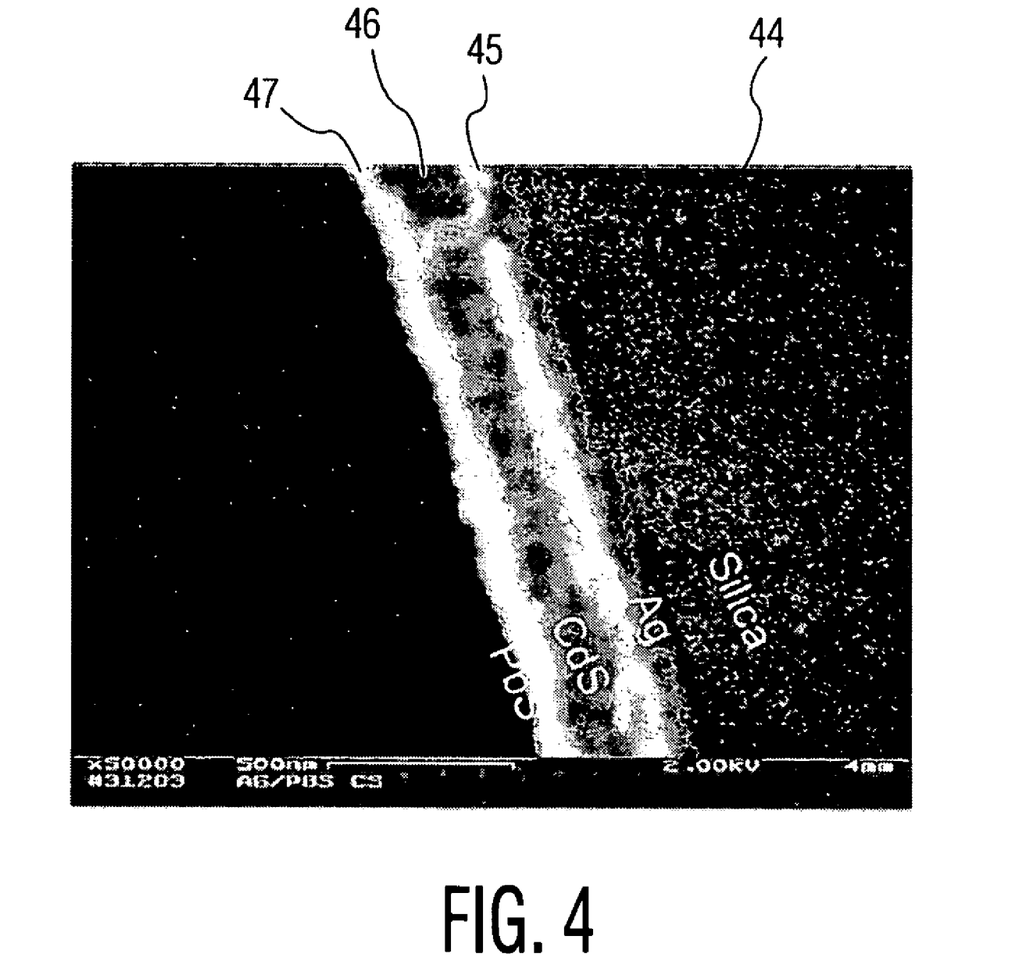
FIG. 4 depicts a graph of the cross-sectional FESEM image of a 1,000-μm bore Ag/CdS/PbS waveguide.

The thickness of the thin films was obtained by direct measurements using a FESEM. A photomicrograph taken with the FESEM for a typical cross-section of the thin film combination on a silica substrate 44 of Ag/CdS/PbS identified as 45, 46, and 47, respectively, is shown in FIG. 4. The CdS film appears darker than the PbS film, because the in-lens detector produces a negative image of the secondary electron image. Also, the silica substrate 44 is a portion of the tube 3. The thicknesses of the films shown in FIG. 4 are; Ag 154 nm, CdS 169±16 nm, PbS 82±6 nm. Degradation was not observed for the underlying film, when the new film is deposited over it. That is, CdS and PbS do not react with each other during the deposition of successive layers. The film thickness measured from FESEM micrographs of both single and multilayer dielectric film are summarized in Table 1, below. These results agree very well with the optical thickness measurement.

TABLE 1

Thickness values for CdS and PbS thin films on Ag determined from FESEM images

| HGWs | Thickness of Ag nm | Thickness of CdS nm | Thickness of PbS nm |
|---|---|---|---|
| Ag/CdS | 156 ± 16 | 172 ± 16 | — |
| Ag/PbS | 158 ± 20 | — | 96 ± 16 |
| Ag/CdS/PbS | 154 | 169 | 82 ± 6 |

Figure 5:
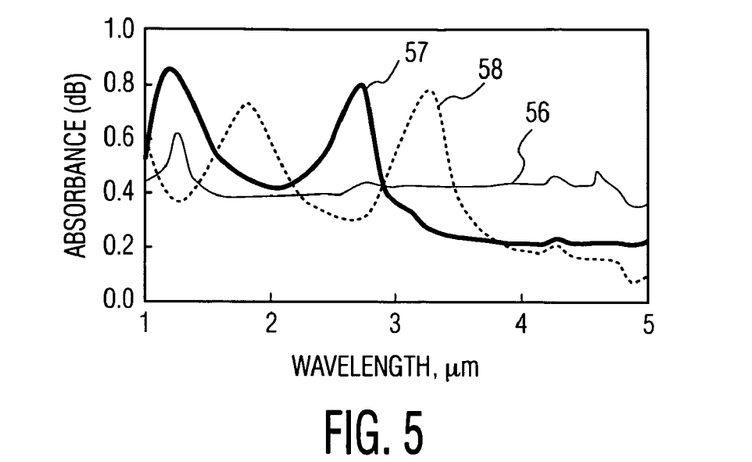
FIG. 5 shows a graph of the FTIR spectra of a 1,000-μm bore of Ag/CdS and Ag/PbS, Ag/CdS/PbS and Ag/CdS/PbS/CdS waveguide.

A series of 1,000-µm-bore HGWs with 1, 2, and 3 dielectric layers deposited over Ag were fabricated using wet chemistry methods (V. Gopal, and J. A. Harrington, "Metal sulfide coatings for hollow glass waveguides," in Optical Fibers and Sensors for Medical Applications III, Proc. SPIE 4957, 97-103 (2003); K. Matsuura, Y. Matsuura, and J. A. Harrington, "Evaluation of gold, silver, and dielectric-coated hollow glass waveguides," Opt. Eng. 35, 3418-3421 (1996)). The spectral losses for these straight waveguides are shown in FIG. 5. From FIG. 5, it may be seen that the addition of each dielectric layer shifts the interference peaks 56, 57, 58, respectively, to longer wavelengths. This is a result of the increase in thickness with each additional layer.

The thickness of each dielectric layer was determined from a witness sample composed of each dielectric layer deposited separately on a slide. These witness samples were deposited along with the multilayer waveguides. From the witness samples we determined the thickness of the individual layers using the position of the long wavelength interference peak from Equation (1). The thicknesses obtained were; Ag 200 nm, CdS (adjacent to 156 nm, PbS 87 nm, and CdS (next to air) 97 nm. The thickness value of CdS and PbS layers measured optically agree very well with FESEM measurements and are within experimental errors as shown in Table 1. From FIG. 5 we see that this waveguide is best suited for operation beyond 5 µm.

Losses measurements were made at 1.55 µm using a diode laser rather than a $CO_2$ laser at 10.6 µn where the HGWs would ultimately be most useful. The reason for using a 1.55 µm laser was that we were interested in developing a new waveguide for secure communication systems at 1.5 µm. Clearly, solid-core silica fibers are a better choice for most applications at 1.55 µm. The output of the diode laser was via a pigtailed single mode fiber terminated with a Selfoc lens. The spectral response of the HGWs chosen for loss measurements was similar to that shown in FIG. 5. In general, coating thicknesses were not optimized for lowest loss at 1.55 µm; however, as may be seen from the cut-back data given in Table 2 (see below), the losses were still quite low. The measured losses in Table 2 may be compared to the theoretical losses calculated at both 1.55 and 10.6 µm using the n and k values of the dielectric films and the theory of Miyagi and Kawakami (M. Miyagi and S. Kawakami, "Design theory of dielectric-coated circular metallic waveguides for infrared transmission," J. Light wave Technol. LT-2, 116-126 (1984)). The losses at 1.55 µm are high when PbS is used because k is rather large at this wavelength (k=0.39). At 10.6 µm k for PbS is 0.008 and the calculated loss for Ag/CdS/PbS/CdS is over four times less than for Ag/CdS. The bending losses for the waveguides were not measured. It is well known that there is an additional loss on bending for non-omni directional waveguides, which varies as 1/R, where R is the radius of the bend (Y. Matsuura, T. Abel, and J. A. Harrington, "Optical properties of small-bore hollow glass waveguides," Appl. Opt. 34, 6842-6847 (1995)). Since our waveguides have no more that 3 dielectric layers it is expected that we not would not observe omni directional behavior rather there would be an added loss on bending.

TABLE 2

Loss values for 1,000-µm bore HGWs with 1, 2, and 3-layer dielectric coatings.

| Multilayer Structure | Measured loss at 1.55 µm, dB/m | Theoretical loss at 1.55 µm, dB/m | Theoretical loss at 10.6 µm, dB/m |
|---|---|---|---|
| Ag/CdS | 0.2 ± 0.04 | $2.7 \times 10^{-3}$ | $7.0 \times 10^{-2}$ |
| Ag/PbS | 0.26 ± 0.04 | $2.5 \times 10^{-2}$ | $7.3 \times 10^{-2}$ |
| Ag/CdS/PbS | 0.1 ± 0.04 | $8.6 \times 10^{-3}$ | $3.3 \times 10^{-2}$ |
| Ag/CdS/PbS/CdS | 0.06 ± 0.04 | $6.7 \times 10^{-3}$ | $1.6 \times 10^{-2}$ |

We have demonstrated that liquid-phase chemistry methods can be used to deposit good optical quality CdS and PbS thin films to form both single and multiple dielectric/metallic HGWs. The spectral response for waveguides with these films deposited over Ag show well defined interference bands indicating good film thickness uniformity over the entire length of the guide. Varying the deposition time controls the position of the interference peaks. Furthermore, we have found that CdS and PbS are compatible and the deposition of each material does not affect the underlying film. In this way the thickness of each layer in the multilayer stack can be tailored for use over a wide wavelength range. The final 3-layer stack showed that it is possible to make a multilayer coating but we have yet to reduce the attenuation to the level predicted by theory. Moreover, the measured losses for the single-layer CdS or PbS films at 1.55 µm are in general agreement with the well studied Ag/AgI HGWs at 10.6 µm (Y. Matsuura, T. Abel, and J. A. Harrington, "Optical properties of small-bore hollow glass waveguides," Appl. Opt. 34, 6842-6847 (1995)). In reality, the greatest potential for these waveguides is likely to be at 10.6 µm for applications involving $CO_2$ laser power delivery and IR fiber sensors.

Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Having thus described the invention, what is desired to be protected by Letters Patent is presented in the subsequently appended claims.

What is claimed is:

1. A flexible, hollow waveguide for transmitting radiation in visible and IR regions, comprising:
   (a) a hollow, flexible tube having a transparent annular body defining a bore with a smooth inner bore surface;
   (b) a reflective metal layer disposed upon the smooth inner bore surface; and
   (c) a composite of dielectric, sulfide-containing materials having a high refractive index ratio, said sulfide-containing materials disposed upon said reflective metal layer and forming a photonic, bandgap tube transmitting in the visible and IR regions.

2. The waveguide in accordance with claim 1, wherein said hollow, flexible tube is composed of glass.

3. The waveguide in accordance with claim 1, wherein said hollow, flexible glass tube is composed of silica-glass.

4. The waveguide in accordance with claim 1, wherein said composite of dielectric, sulfide-containing materials comprise disparate refractive indices of approximately 2:1.

5. The waveguide in accordance with claim 4, wherein said metallic layer is selected from a group of metals consisting of: Ag, Au, Cu, Pt, Ni, Mb, Al, and combinations thereof.

6. The waveguide in accordance with claim 4, wherein the composite of sulfide-containing materials respectively comprise paired composite layers of cadmium sulfide and lead sulfide.

7. The waveguide of claim 4, wherein said outer layer is composed of a material selected from a group of materials consisting of plastic, and silicone.

8. The waveguide in accordance with claim 1, further comprising:
   (d) an outer layer surrounding the hollow, flexible tube.

9. A flexible, hollow waveguide, comprising:
   (a) a flexible, hollow tube having a transparent annular body defining a bore with a smooth inner bore surface;
   (b) a metallic layer disposed upon the smooth inner bore surface; and
   (c) a composite of dielectric materials disposed upon the metallic layer featuring disparate refractive indices with a ratio of approximately 2:1, wherein the composite of dielectric materials form sulfide-containing layers.

10. The waveguide in accordance with claim 9, wherein said composite of dielectric materials respectively comprise two sulfide-containing layers.

11. The waveguide in accordance with claim 9, wherein said metallic layer is selected from a group of metals consisting of: Ag, Au, Cu, Pt, Ni, Mb, Al, and combinations thereof.

12. The waveguide in accordance with claim 11, wherein said outer layer is selected from a group of materials consisting of plastic, and silicone.

13. The waveguide in accordance with claim 9, further comprising:
   (d) an outer layer surrounding the hollow flexible tube.

14. The waveguide in accordance with claim 9, wherein the composite of dielectric materials respectively comprise cadmium sulfide and lead sulfide.

15. A flexible, hollow waveguide for transmitting radiation in visible and IR regions, comprising:

(a) a hollow, flexible tube having a transparent annular body defining a bore with a smooth inner bore surface; and (b) a composite of dielectric, paired sulfide-containing materials having a high refractive index ratio, said sulfide-containing materials disposed upon said hollow tube, and forming a photonic, bandgap tube transmitting in the visible and IR regions.

16. The waveguide in accordance with claim 15, wherein said hollow, flexible tube is composed of glass.

17. The waveguide in accordance with claim 15, wherein said hollow, flexible glass tube is composed of silica-glass.

18. The waveguide in accordance with claim 15, wherein said composite of dielectric, sulfide-containing materials comprise disparate refractive indices of approximately 2:1.

19. The waveguide in accordance with claim 18, further comprising:

(d) an outer layer surrounding the hollow, flexible tube.

20. The waveguide of claim 19, wherein said outer layer is composed of a material selected from a group of materials consisting of plastic, and silicone.

21. The waveguide in accordance with claim 15, wherein the composite of sulfide-containing materials respectively comprise paired composite layers of cadmium sulfide and lead sulfide.

22. A flexible, hollow waveguide, comprising:

(a) a flexible, hollow tube having a transparent annular body defining a bore with a smooth inner bore surface; and (b) a composite of dielectric materials disposed upon the smooth inner bore surface of said transparent annular body, featuring disparate refractive indices with a ratio of approximately 2:1, wherein said composite of dielectric materials respectively comprise two sulfide layers.

23. The waveguide in accordance with claim 22, further comprising:

(d) an outer layer surrounding the hollow flexible tube.

24. The waveguide in accordance with claim 23, wherein said outer layer is selected from a group of materials consisting of plastic, and silicone.

25. The waveguide in accordance with claim 22, wherein the composite of dielectric materials respectively comprise cadmium sulfide and lead sulfide.

26. A method of fabricating a flexible, hollow waveguide using liquid phase deposition, comprising the steps of:

(a) depositing a metallic layer on a smooth, inner bore surface of a hollow, flexible, silica-glass tube; and (b) depositing two sulfide-containing layers, cadmium sulfide and lead sulfide, respectively, upon said metallic layer of step (a).

27. A method of fabricating a flexible, hollow waveguide using liquid phase deposition, comprising the steps of:

(a) depositing at first layer of cadmium sulfide upon an inner, smooth bore surface of a hollow silica-glass tube; and (b) depositing at least a second layer of lead sulfide over said first layer of cadmium sulfide.

28. The method in accordance with claim 27, wherein multiple sulfide-containing layers of cadmium sulfide and lead sulfide, respectively, are stack deposited upon said inner, smooth bore of said hollow tube.

* * * * *